United States Patent [19]
Bridgett

[11] 3,898,371
[45] Aug. 5, 1975

[54] WIRING HARNESS AND METHOD OF MAKING SAME

[75] Inventor: John Leslie Bridgett, Stoke-on-Trent, England

[73] Assignee: Rist's Wires & Cables Limited, Birmingham, England

[22] Filed: Feb. 19, 1974

[21] Appl. No.: 443,794

[30] Foreign Application Priority Data
Feb. 23, 1973   United Kingdom................ 8885/73

[52] U.S. Cl. ............. 174/72 A; 156/47; 174/117 F
[51] Int. Cl.² ......................................... H02G 3/02
[58] Field of Search .......... 174/72 A, 72 TR, 117 R, 174/117 F, 117 FF, 117 PC, 117 A; 156/47

[56] References Cited
UNITED STATES PATENTS

| | | | |
|---|---|---|---|
| 3,676,572 | 7/1972 | Davies | 174/69 |
| 3,733,428 | 5/1973 | Fry | 174/72 A |
| 3,819,848 | 6/1974 | Fry | 174/72 A |

FOREIGN PATENTS OR APPLICATIONS
2,133,241   1/1973   Germany........................... 174/68.5

*Primary Examiner*—Laramie E. Askin
*Attorney, Agent, or Firm*—Holman & Stern

[57] ABSTRACT

A wiring harness including an elongate flexible thermoplastic backing strip to which is secured a first lead. The first lead comprises a conductive core in a thermoplastic sheath, and is secured to the backing strip so as to extend longitudinally of the backing strip, by having its sheath fused to the backing strip. A second similar lead is also secured to the backing strip, and is arranged so as to be turned back on itself part way along the backing strip to define first and second generally parallel runs. The backing strip is slit to define a flexible flap integral with the remainder of the backing strip, the flexible flap having secured thereto a portion of the first lead, and one of said first and second runs of the second lead.

4 Claims, 1 Drawing Figure

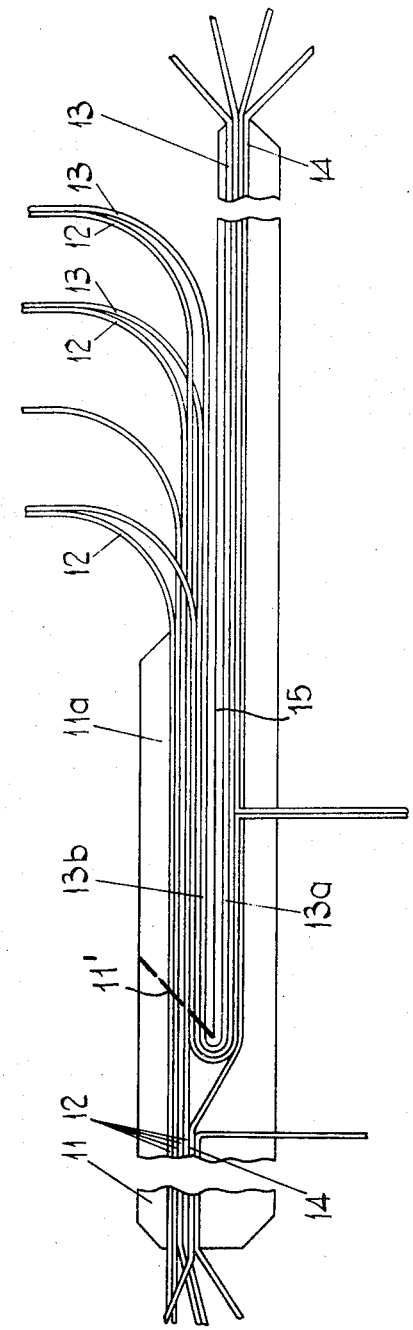

WIRING HARNESS AND METHOD OF MAKING SAME

This invention relates to wiring harnesses.

A wiring harness according to the invention includes an elongate, flexible, thermoplastic backing strip, a first lead comprising a conductive core in a thermoplastic sheath, the first lead extending longitudinally of the backing strip and the sheath of the lead being fused to the backing strip to secure the lead to the backing strip, a second lead comprising a conductive core in a thermoplastic sheath, the second lead extending longitudinally of the backing strip and being turned back on itself so as to define first and second generally parallel runs, the sheath of the second lead being fused to the backing strip to secure the second lead to the backing strip, and the backing strip being slit to define a flexible flap integral with the remainder of the strip and having secured thereto a portion of the first lead and one of said first and second runs of the second lead.

The invention further resides in a method of manufacturing a wiring harness including the steps of positioning a first lead having a conductive core in a thermo-plastic sheath on a platform, positioning a second lead also including a conductive core in a thermoplastic sheath on the platform so that the second lead is turned back on itself and includes first and second runs generally parallel to said first lead, and fusing to the sheaths of the leads an elongate flexible thermoplastic backing strip.

Preferably, the method includes the subsequent step of slitting the backing strip to define a flexible flap integral with the remainder of the backing strip and having secured thereto a portion of the first lead and one of said first and second runs of the second lead.

Alternatively, the backing strip is slit to define a flexible flap integral with the remainder of the backing strip prior to engagement of the strip with the leads, the backing strip being engaged with the leads such that the flap engages a portion of the first lead and one of said first and second runs of the second lead.

The accompanying drawing is a plan view of a wiring harness in accordance with one example of the present invention.

Referring to the drawing, the harness includes an elongate flexible backing strip 11 formed from thermoplastic material, conveniently polyvinylchloride. Secured to the backing strip are a plurality of conductive leads which can be considered for convenience as three groups of leads 12, 13 and 14 respectively. The leads 12 can be considered as extending from the left hand end of the backing strip adjacent the upper edge thereof to a point adjacent the right hand end of the backing strip. The lead 14 extends along the complete length of the backing strip, and the leads 13 extend from the right hand end of the backing strip to a point over half way along the length of the backing strip, and are then bent through 180° to extend back towards the right hand end of the backing strip. The leads 13 therefore include first and second runs 13a, 13b which are generally parallel to the leads 12. The return runs 13b of the leads 13 lie between the outgoing runs 13a and the leads 12. Between the runs 13a and 13b the backing strip 11 is slit 15 to define a flap 11a integral with the remainder of the backing strip 11 and carrying the run 13b of the leads 13 and portions of the leads 12. The flap 11a is of course flexible, and so can be bent along for example the dotted line 11' shown in the drawing so that the flap 11a and its associated lead portions lie at right angles to the remainder of the harness. Thus the harness can have a lateral limb integral with the remainder of the harness and constructed in the same operation as the manufacture of the remainder of the harness. Each of the leads of the harness of course includes a conductive core in a thermo-plastic, conveniently polyvinylchloride, sheath, and the leads are secured to the backing strip 11 by fusion of the sheaths of the leads to the backing strip 11 as will be described later.

In the harness shown in the drawing the flap 11a which will constitute the lateral limb of the harness is defined adjacent one lateral edge of the backing strip 11. However, it is to be appreciated that the flap 11 could if desired be provided wholly within the periphery of the backing strip 11 by providing the backing strip 11 with a U-shaped slit. Thus, leads equivalent to the lead 14 which do not form part of the lateral limb could pass on both sides of the limb between the ends of the principal run of the harness.

The harness described above is of course of particular use where feed, and return electrical connections need to be made to electrical components physically spaced from the harness. Thus, for example, one of the leads 12 may be a feed to a component and one of the leads 13b may be the return lead for the same component.

The harness is constructed in the following manner. The leads 12, 13, 14 are laid side by side in the pattern which they will occupy in the finished harness. The backing strip 11 in the form of a continuous strip of polyvinylchloride is then fed from a spool onto the leads starting at one end of the harness, for example the left hand end. As the backing strip 11 is laid onto the leads, the mutually presented surfaces of the leads and the backing strip are heated to a temperature such that, as the backing strip engages the sheaths of the leads, fusion occurs between the sheaths and the backing strip. When the backing strip 11 has been secured to the leads along the whole of their length, the backing strip is separated from the remainder of the backing strip on the spool and is provided with the necessary slit or slits to define the flap 11a. Since the leads of the harness are laid, in the first instance, in their intended final orientation, it would be appreciated that the leads can be cut to the correct length, and can be provided with the necessary terminals at their ends prior to the provision thereof of the backing strip.

In a modification, the backing strip 11 is not fed from a reel of polyvinylchloride strip, but is pre-formed to the required final form before engagement with the leads. Once again the leads are laid out in their desired final pattern, and the pre-formed backing strip 11 is then laid onto the leads. The backing strip is again fused to the leads progressively along the length of the leads as the backing strip is laid onto the leads, or alternatively is laid completely on the leads and is then fused to the sheaths of the leads by means of, for example, a radio frequency welding tool which heats the surfaces of the sheaths of the leads and the backing strip which are in contact. It will be appreciated that once the backing strip and the sheaths of the leads are in contact, then some form of heating device which heats the contacting surfaces sufficiently to cause fusion, without melting the remainder of the sheaths and the backing strip, must be utilized.

The harnesses described above are particularly, but not exclusively, intended for use in road vehicles. It is to be appreciated, however, that such harnesses can also be used in a wide variety of other applications, for example, in domestic appliances.

I claim:

1. A wiring harness including a flexible, thermoplastic backing strip, a first lead comprising a conductive core in a thermoplastic sheath, the first lead extending longitudinally of the backing strip and the sheath of the lead being fused to the backing strip to secure the lead to the backing strip, a second lead comprising a conductive core in a thermoplastic sheath, the second lead extending longitudinally of the backing strip and being returned back on itself so as to define first and second generally parallel runs, the sheath of the second lead being fused to the backing strip to secure the second lead to the backing strip and the backing strip being slit to define a flexible flap integral with the remainder of the strip and having secured thereto a portion of the first lead and one of said first and second runs of the second lead, the remainder of the first lead, and the other of said first and second runs of said second lead being on the remainder of the backing strip, said other run extending towards one end of the backing strip, and said remainder of said first lead extending towards the opposite end of the backing strip.

2. A wiring harness as claimed in claim 1 including a third lead comprising a conductive core in a thermoplastic sheath, extending parallel to said first lead and having its sheath fused to the backing strip, said third lead extending longitudinally of the backing strip and on the side of said slit remote from the first lead.

3. A method of manufacturing a wiring harness including the steps of positioning a first lead having a conductive core in a thermoplastic sheath on a platform, positioning a second lead also including a conductive core in a thermoplastic sheath on the platform so that the second lead is turned back on itself and includes first and second runs generally parallel to said first lead, fusing to the sheaths of the leads an elongate flexible thermoplastic backing strip, and, slitting the backing strip to define a flexible flap integral with the remainder of the backing strip, the flexible flap having secured thereto a portion of the first lead and one of said first and second runs of the second lead, the remainder of the first lead, and the other of said first and second runs of the second lead being on the remainder of the backing strip, said other run extending towards one end of the backing strip, and said remainder of said first lead extending towards the opposite end of the backing strip.

4. A method of manufacturing a wiring harness including the steps of positioning a first lead having a conductive core in a thermoplastic sheath on a platform, positioning a second lead also including a conductive core in a thermoplastic sheath on the platform so that the second lead is turned back on itself and includes first and second runs generally parallel to said first lead, and, fusing to the sheaths of the leads an elongate flexible thermoplastic backing strip, said backing strip being slit to define a flexible flap integral with the remainder of the backing strip prior to engagement of the backing strip with the leads, the backing strip being engaged with the leads such that the flap engages a portion of the first lead and one of said first and second runs of the second lead, the remainder of the first lead, and the other of said first and second runs of said second lead engaging the remainder of the backing strip, said other run extending towards one end of the backing strip, and said remainder of said first lead extending towards the opposite end of the backing strip.

* * * * *